July 12, 1960     I. I. SIKORSKY     2,944,609
HELICOPTER POWER TRANSMISSION SYSTEM
Filed June 1, 1956     3 Sheets-Sheet 1

INVENTOR
I. I. SIKORSKY

July 12, 1960 — I. I. SIKORSKY — 2,944,609
HELICOPTER POWER TRANSMISSION SYSTEM
Filed June 1, 1956 — 3 Sheets-Sheet 2

INVENTOR
I. I. SIKORSKY
BY Jack N. McCarthy
AGENT

July 12, 1960   I. I. SIKORSKY   2,944,609
HELICOPTER POWER TRANSMISSION SYSTEM

Filed June 1, 1956   3 Sheets-Sheet 3

INVENTOR
I. I. SIKORSKY
BY Jack N. McCarthy
AGENT

United States Patent Office 2,944,609
Patented July 12, 1960

2,944,609

HELICOPTER POWER TRANSMISSION SYSTEM

Igor I. Sikorsky, Easton, Conn., assignor to United Aircraft Corporation, East Hartford, Conn., a corporation of Delaware Filed June 1, 1956, Ser. No. 588,737

18 Claims. (Cl. 170—135.4)

This invention relates to helicopters and more particularly to an improved power transmission system and power plant arrangement for helicopters.

In the majority of modern helicopters of small and medium size, the power of one or more engines is directly transmitted by shafts and gears to the rotor or rotors. This system gives satisfactory results in such aircraft; however, when adapted to very large machines, certain inconveniences can be anticipated.

As a rule there are certain locations in which it would be best to mount the engines from the standpoint of their centers of gravity, aerodynamic resistance, convenient release of exhaust gases, ease of attachment to other parts of the aircraft and ease of maintenance. These locations, however, may not be the best for the engine as regards transmitting of its power to the rotor. Consequently, it may become necessary to use long shafts, introduce extra transmission boxes to change the shaft direction and provide very rigid mounting of the engines in order not to disturb alignment of the shafts. In large aircraft the above factors may involve undue increase in structural weight or necessitate an arrangement of the engines which may not be the most convenient from the standpoint of maintenance, aerodynamic resistance and other factors.

In this invention, one or several engines or turbines are mounted in whatever location the designer chooses for the particular aircraft in connection with the center of gravity, flow of cooling air, support on the landing gear, maintenance, loading of passengers, and other considerations but without the necessity of considering the transmitting of the power to the rotor shaft. All the power of the engines or turbines is directly applied to air compressors. Compressed air, by way of proper manifolds or conduits, is then sent to the vicinity of the rotor shaft where the compressed air operates a series of turbines. The turbines may be mounted directly on a frame adjacent to the main rotor and transmitting power either to the shaft or directly to the rotor hub by way of such reduction gears as would best suit the particular design. While other types of rotor heads and gearing arrangements can be used, as herein shown the turbines deliver their power through one or more reduction stages reaching a moderately large bull gear which, in turn, feeds all the power either directly into the rotor hub or more probably into the last planetary reduction stage which, in turn, transmits either to the shaft or directly to the rotor hub.

Among the other advantages of such a system is the fact that it permits having a compact and very light system directly adjacent to the rotor. If we assume an ordinary turbine delivering 1000 H.P., it is known that actually the turbine wheel would deliver about 3000 H.P.; in this case 2000 H.P. would be consumed by the compressor of the turbine and only 1000 H.P. would be available for turning the rotor. In this invention, similar turbines would weigh substantially less because the compressor stages would be absent. Moreover, they will deliver 3000 H.P. instead of 1000 H.P. because the compression of air is handled by the other engines or turbines located below in a convenient place.

It is therefore an object of the present invention to create an arrangement which would enable the designer to locate the engines in any place and in any position and to arrange for a convenient method of transmitting any amount of power to the rotor hub.

A further object of the invention is to provide a system having the flexibility which would permit relocating the engine according to different versions of a given design should particular problems or missions necessitate such relocation.

Another object of this invention is to provide a system which would permit the elimination of clutches and provide greater facility in the control of the power units.

It is also an object of this invention to provide improved rotor driving means for helicopters, and more specifically to provide an arrangement wherein a power generating master or primary turbine or turbines compress air which is ducted through manifolding to each of a series of smaller or secondary turbines located around the periphery of a large diameter master gear coaxial with the rotor.

Another object of the invention is to provide a simplified transmission arrangement the final drive of which can be transmitted to the rotor head at a plurality of points radially spaced a substantial distance from the axis of rotation thereby reducing the load on the gear teeth.

A further object of the invention is to provide a transmission system and power plant arrangement permitting a great degree of flexibility in the location of the turbines.

A still further object of the invention is to provide a power plant especially suitable for large helicopters in which the power from one or more large gas turbines is applied to the rotor head with a minimum of weight in the transmission mechanism.

A yet further object of the invention is to provide a higher factor of safety in the power transmission system of a helicopter.

A further object of the proposed device is to permit a flexible suspension between the rotor transmission unit which includes the secondary turbines and the main body of the aircraft which includes the main turbine, the cargo or passenger compartment and other parts. Any kind of flexible suspension could be used as there would be no shaft requiring proper alignment.

A further object is generally to improve the construction and arrangement of helicopter transmission systems and power plants.

These and other objects and advantages of the present invention will be evident or will be pointed out in connection with a detailed description of a preferred embodiment of the invention shown in the accompanying drawings.

Figure 1:
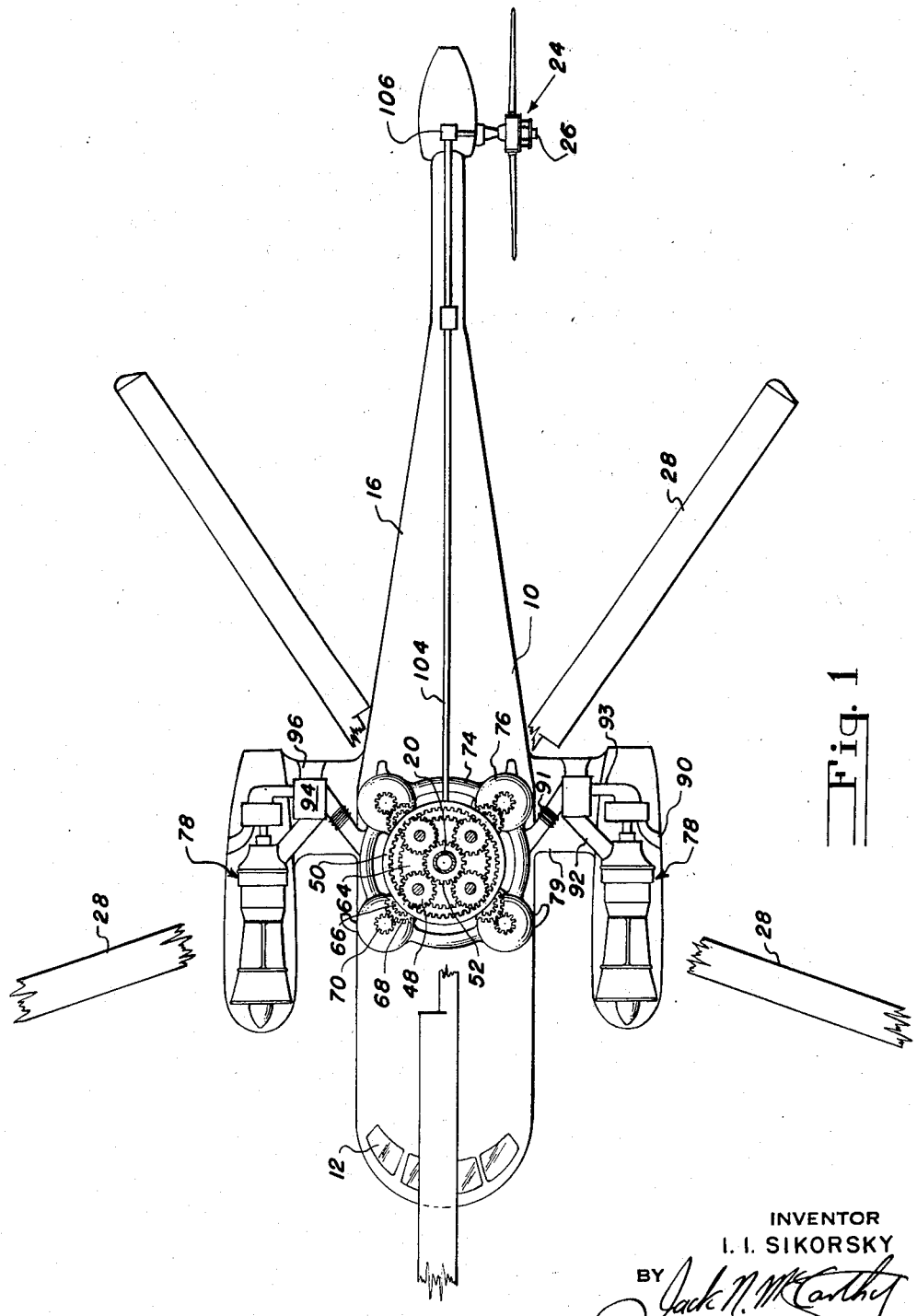
Fig. 1 is a plan view partly in section of a helicopter embodying the invention, the section through the transmission being taken on line 1—1 of Fig. 3.
Figure 2:
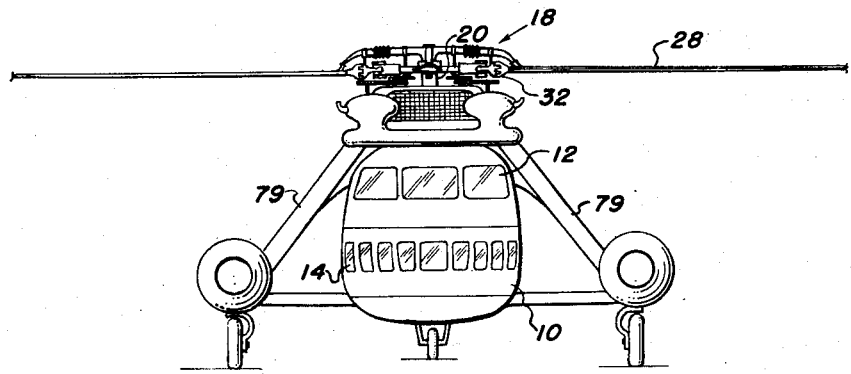
Fig. 2 is a front view of the helicopter of Fig. 1.

Referring first to Figs. 1 and 2, the helicopter includes an elongated fuselage 10 having an upper pilot compartment 12 at its forward extremity and a lower passenger or cargo compartment 14 which extends beneath compartment 12 and well aft into the tail cone 16. A main rotor generally indicated at 18 is supported for rotation about a fixed upstanding mast 20. At the extremity of the tail cone an upstanding pylon is provided which supports an antitorque tail rotor generally indicated at 24 rotatable about a horizontal drive shaft 26.

Figure 3:
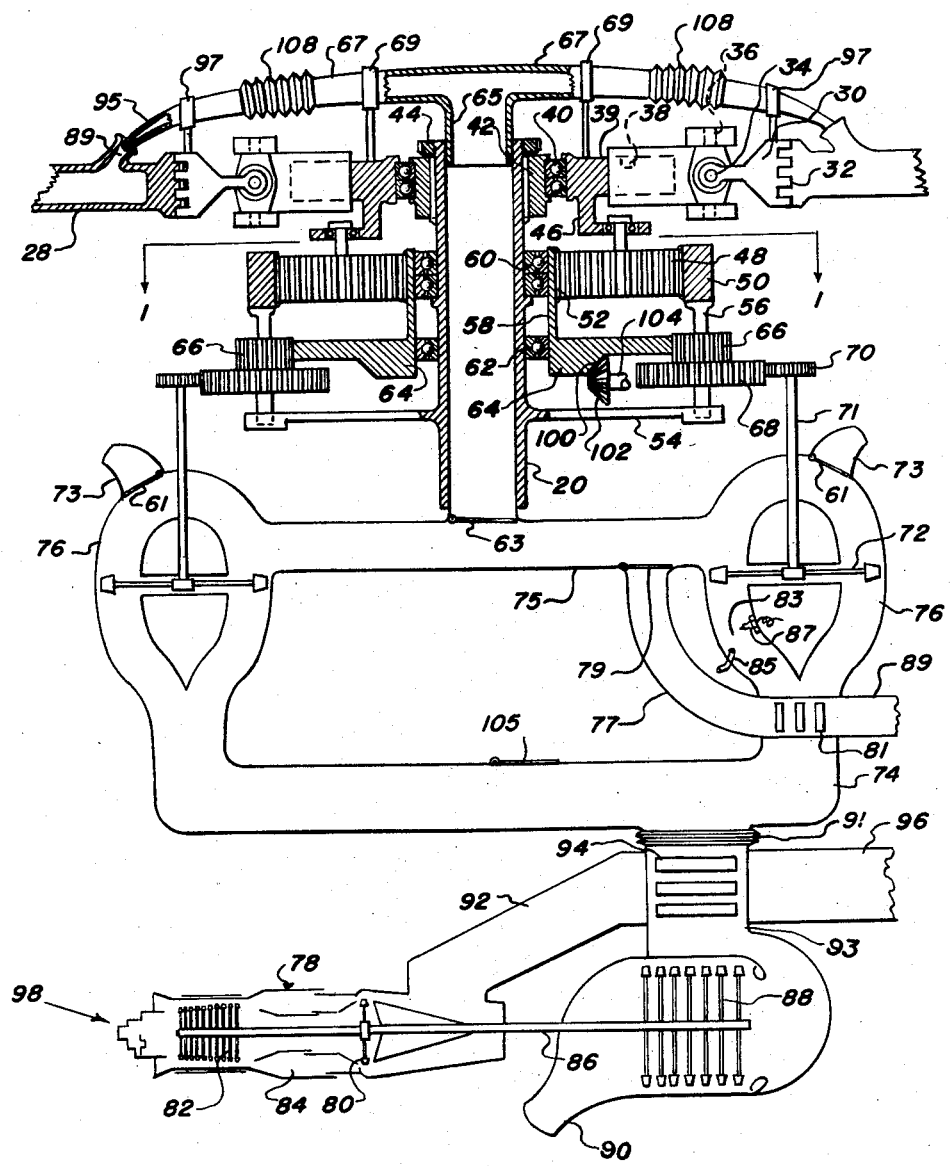
Fig. 3 is a somewhat diagrammatic view of the combined power plant and transmission.

The main rotor blades 28 are attached to flapping links 30 by the usual double folding hinges 32 (Fig. 3). The blades which are normally rigidly supported on the flapping links 30 are free to move about the horizontal flapping hinges 34 and also in the plane of blade rotation about generally vertically pivoted drag hinges 36. The blades are also free to move about their longitudinal axes on pitch changing bearings 38 which are carried by the rotor hub 39. The usual swash plate is provided (not shown) for effecting collective pitch control and cyclic pitch control of the rotor blades in a well known manner.

Rotor hub 39 is mounted on bearings 40 for rotation about a sleeve 42 fixed to the upper end of mast 20 which is supported on fixed structure of the helicopter. As shown somewhat diagrammatically in Fig. 3, sleeve 42 is supported against upward displacement on the mast by a spanner nut 44. Hub 39 has depending supports 46 on which a plurality of planetary pinions 48 are journalled in position to mesh with a ring gear 50 and a sun gear 52. Ring gear 50 is supported rigidly from mast 20 by a plate 54 secured to the mast which carries a plurality of upstanding shafts 56. Sun gear 52 is mounted on a sleeve 58 which is journalled on the mast 20 by bearings 60 and 62. Sleeve 58 is integral with a master gear 64 of large diameter which meshes with a plurality of pinions 66 which are rotatable on shafts 56. Shafts 56 and their pinions 66 are spaced about the periphery of the master gear 64 and in the helicopter shown are four in number. Pinions 66 have integral therewith coaxial gears 68, each of which is driven by a pinion 70 mounted on a shaft 71 of a secondary turbine 72.

Figure 4:
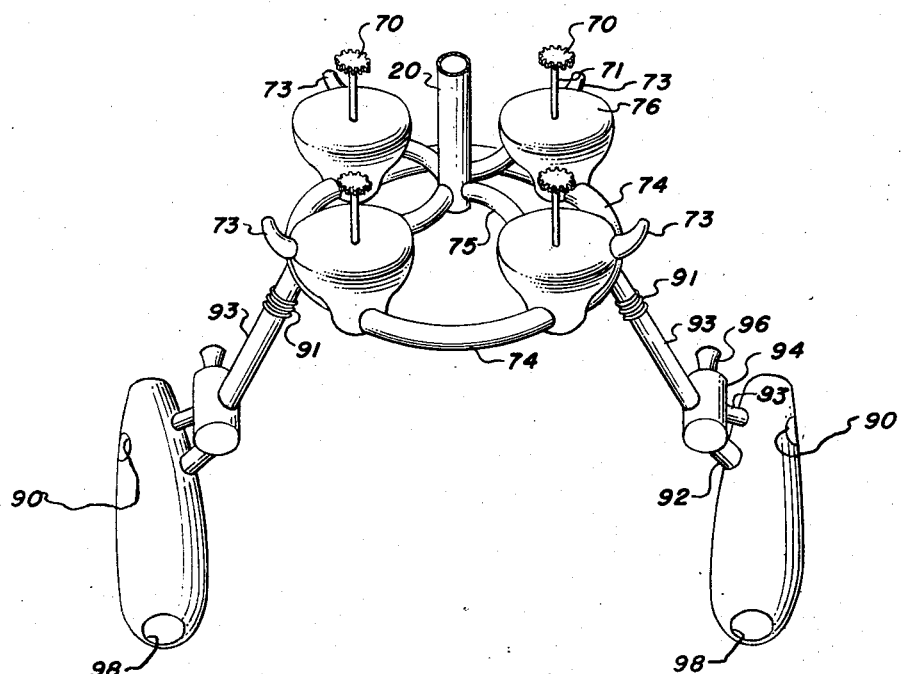
Fig. 4 is an isometric view of the main and secondary turbines.

The four turbines 72 as shown most clearly in Fig. 4 are supported on an annular inlet manifold 74 and include the annular housing 76 for the turbine blades in communication with fluid discharge ducts 75 leading to the interior of the hollow mast 20.

Turbines 72 are driven by fluid discharged from compressor 88 each driven by one of the main gas turbine engines 78, shown herein as two in number, carried by stub wings 79 on opposite sides of the fuselage. Each engine includes the usual turbine 80, compressor 82 and burners 84 and is connected by a shaft 86 to a compressor 88. Compressor 88 takes in air at inlet 90 and discharges into a duct 93 which is connected with manifold 74. Duct 93 includes a flexible coupling 91 which permits a flexible suspension between the rotor transmission, including the secondary turbines 76, and the main body of the aircraft. While a simple bellows 91 has been shown, many different flexible type couplings could be used. The discharge from turbine 80 is directed by a duct 92 through a heat exchanger 94 located in duct 93 and is discharged through a duct 96.

In operation air enters the main axial flow gas turbine engines 78 at 98 and is compressed by compressor 82 and discharged through turbine 80, heat being added by the burners 84. The hot discharge from turbine 80 passes through duct 92, through heat exchanger 94 and out duct 96, a porportion of the heat in this fluid being added to the relatively cool air which enters compressor 88 at 90 and passes through the heat exchanger 94 to manifold 74.

The hot clean air entering manifold 74 passes through each housing 76 driving secondary turbines 72, or has additional fuel added therein by a nozzle such as 85 which would be burned at 83 by an igniter 87 in a combustion chamber of each secondary turbine. This would provide added power. From each turbine 72 the air or gases may be passed directly out through a nozzle 73 by opening a valve 61. However, in some installations it may be advantageous to superheat the air supplied to the secondary turbines. To this end a duct or series of ducts 77 are provided branching out of ducts 75 (one such arrangement is shown in Fig. 3). For each duct 77 a valve 79 is provided to permit air or gas to pass from the turbines 72 through a heat exchanger 81 located between the manifold 74 and the duct 77. The air or gases are discharged therefrom through exhausts 89. In this mode of operation the valve 61 would remain closed. If desired, valves 61 and 79 can remain closed and valve 63 can be opened permitting the hot air or gases to pass through mast 20 where they will be directed into each blade 28 in a manner to be hereinafter described. This heated air directed into each blade can be used to heat the blades, for deicing as an example, or burned to give added power to the rotor by the use of nozzles in the blades.

The top of mast 20 has a telescoping member 65 positioned therein. The telescoping member 65 which is closed at its upper end has five ducts 67 extending therefrom, one for each blade connected to the rotor head. Each duct 67 has a clamp 69 therearound which is fixedly attached to the rotor hub 39 by an arm. Each blade 28 is hollow (see Fig. 3) and has an opening 89 formed as a throat section. A nozzle 95 is fixed to the flapping link 30 of each blade 28. Each nozzle 95 has a clamp 97 therearound which has an arm extending to the adjacent flapping link. The discharge end of the nozzle is positioned in the center of the throat portion of the cooperating blade 28 with an area being left therearound to produce an ejecting effect. Each duct 67 is connected to a nozzle 95 by a flexible coupling 108. This provides for ease of blade movement with respect to the rotor. The ejector is formed to provide a control for the gas flowing into the blade. This is necessary to provide the proper temperature.

In a multiple-engined installation it may be advantageous to use separate manifolds from each of the lower engine compressor units into one or more separate secondary turbines so that in case of failure of the main compressor unit some of the secondary turbines would go out of commission but the others would work as usual.

The rotating shafts 71 of the four secondary turbines 72 rotate their respective gears 68 and pinions 66 which mesh with the master gear 64 thus driving the latter at four spaced points about its periphery. Rotation of gear 64 and the integral sun gear 52 causes the planetary gears 48 to rotate about the ring gear 50 and drive the hub 39 which actually constitutes a spider or planet carrier for the planet gears 48.

The master gear 64 has a beveled gear 100 cut in its hub which meshes with a beveled pinion 102 on a tail rotor drive shaft 104 which drives the tail rotor 24 through the usual right angle gear box 106 located in the tail rotor pylon. The tail rotor may also be fed by compressed air and one or more auxiliary turbines mounted in the rear or even by a completely independent power plant system mounted directly at the end near the tail rotor or rotors. In a system of this nature it would be possible to use a governor and consequently allow the system to be self-regulating with the pilot operating only the pitch of the rotors which would be supplied automatically with the necessary power.

As a result of this construction, it will be evident that the massive drive shaft currently employed to drive the main rotor is eliminated as well as much of the weight of the usual gear box mechanism, the drive shaft being replaced by a relatively light fixed mast about which the rotor hub and planetary gearing rotates. Also, it will be evident that by providing a plurality of secondary turbines which drive at a plurality of points on the periphery of a master gear in the transmission it is possible to reduce the tooth pressures which were formerly encountered in helicopter gear boxes of the conventional type.

As a result of employing a plurality of secondary turbines arranged around the periphery of the master gear and ducting the discharge from the main gas turbine engine to the secondary turbines a much more flexible power plant arrangement results. A valve 105 is provided to release or control the pressure in the manifold 74 by bypassing compressed air from said manifold to exhaust without going through any secondary turbines. This arrangement would eliminate the need of clutches in the system and would permit the running of the engines for any length of time and at any speed without transmitting power to any secondary turbine.

The transmission system and power plant arrangement disclosed herein is of particular advantage in very large helicopters where the conventional gear box and rotor drive shaft construction would become prohibitively heavy. A further advantage resides in the fact that the flexibility afforded in arranging the primary and secondary turbines permits the primary turbine or turbines to be located out of the passenger compartment of the helicopter thus resulting in an unobstructed passenger or cargo compartment.

Also, the use of a main gas turbine for driving a plurality of secondary turbines provides a valuable safety feature since the failure of one or more of the turbines will not disable the helicopter. A further advantage of the proposed system can also be seen from the fact that in case of engine failure for a brief period of time it would be possible to use somewhat higher temperatures in the remaining secondary turbines and consequently use a greater proportion of the power produced by the main power units. Duct 96 terminates in a nozzle in wing 79. Exhaust 89 also terminates in a nozzle.

While only a single embodiment of the invention is shown herein, it will be understood that various changes may be made in the construction and arrangement of the transmission and associated power plant without departing from the scope of the invention.

I claim:

1. In a helicopter, a body, a rotor supported for rotation on said body, gear means for driving said rotor, said gear means including a master gear, said master gear being journalled for rotation about the axis of rotation of said rotor, a plurality of turbines arranged about the periphery of said master gear, each turbine having a gear with a driving connection with said master gear, a manifold connected to the inlets of said turbines for supplying fluid under pressure to drive said turbines, and means for supplying fluid under pressure to said manifold, said last named means including two compressors each driven by a separate prime mover, the outlet of one compressor being connected to said manifold between a pair of turbines, the outlet of the other compressor being connected to said manifold between another pair of turbines.

2. In a helicopter, a body, said body having a mast, a rotor supported for rotation on said mast, gear means for driving said rotor, said gear means including a master gear, said master gear being journalled for rotation about the axis of rotation of said rotor, a plurality of secondary turbines arranged about the periphery of said master gear, each turbine having a pinion gear with a driving connection with said master gear, a manifold connected to the inlets of said turbines for supplying fluid under pressure to drive said turbines, a plurality of compressors each having their outlets connected only to said manifold by a discharge passage, each of said compressors being driven by a primary turbine, and a heat exchanger in one of said discharge passages said heat exchanger having the gas from a primary turbine directed therethrough to atmosphere.

3. In a helicopter, a body, said body having a mast, a rotor supported for rotation on said mast, gear means for driving said rotor, said gear means including a master gear, said master gear being journalled for rotation about the axis of rotation of said rotor, a plurality of secondary turbines arranged about the periphery of said master gear, each secondary turbine having an inlet and outlet, each turbine having a pinion gear with a driving connection with said master gear, a manifold connected to the inlets of said turbines for supplying fluid under pressure to drive said turbines, a plurality of compressors each having their outlets connected only to said manifold by a discharge passage, each of said compressors being driven by a primary turbine, a first heat exchanger in one of said discharge passages, said first heat exchanger having the gas from one of said primary turbines directed therethrough, a second heat exchanger in one of said secondary turbine inlets, said second heat exchanger having the gas from one of said secondary turbines directed therethrough.

4. In a helicopter, a body, said body having a mast, a rotor supported for rotation on said mast, gear means for driving said rotor, said gear means including a master gear, said master gear being journalled for rotation about the axis of rotation of said rotor, a plurality of secondary turbines arranged about the periphery of said master gear, each secondary turbine having an inlet and outlet, each turbine having a pinion gear with a driving connection with said master gear, a manifold connected to the inlets of said turbines for supplying fluid under pressure to drive said turbines, a plurality of compressors each having their outlets connected only to said manifold by a discharge passage, means for bypassing fluid from said manifold, each of said compressors being driven by a primary turbine, a first heat exchanger in one of said discharge passages, said first heat exchanger having the gas from one of said primary turbines directed therethrough, a second heat exchanger in one of said secondary turbine inlets having the gas from one of said secondary turbines directed therethrough.

5. In a helicopter, a body, said body having a fixed mast, a rotor supported for rotation above said body on said mast, gear means for driving said rotor, said gear means including a master gear, said master gear being journalled for rotation about the axis of rotation of said rotor, a plurality of secondary turbines arranged about the periphery of said master gear, each secondary turbine having a turbine rotor and an inlet and outlet, each turbine having a pinion gear with a driving connection with said master gear, a manifold connected to the inlets of said turbines for supplying fluid under pressure to drive said turbines, a plurality of compressors each having their outlets connected only to said manifold by a discharge passage, each of said compressors being driven by a primary turbine, a first heat exchanger in one of said discharge passages, said first heat exchanger having the gas from one of said primary turbines directed therethrough, a second heat exchanger in one of said secondary turbine inlets having the gas from one of said secondary turbines directed therethrough, means in said secondary turbine inlet between said second heat exchanger and said turbine rotor for injecting and burning fuel.

6. In a helicopter, a body, said body having a mast, a rotor supported for rotation on said mast, gear means for driving said rotor, said gear means including a master gear, said master gear being journalled for rotation about the axis of rotation of said rotor, a plurality of secondary turbines arranged about the periphery of said master gear, each turbine having a pinion gear with a driving connection with said master gear, an annular manifold connected to the inlets of said turbines for supplying fluid under pressure to drive said turbines, means for releasing fluid from said manifold for controlling said secondary turbines, a plurality of compressors each having their outlets connected only to said manifold by a discharge passage, each of said compressors being driven by a primary turbine, and a heat exchanger in one of said discharge passages, said heat exchanger having the gas from one of said primary turbines directed therethrough.

7. In a helicopter, a body, said body having a hollow mast, a rotor supported for rotation on said mast, gear means for driving said rotor, said gear means including a master gear, said master gear being journalled for rotation about the axis of rotation of said rotor, a plurality of turbines arranged about the periphery of said master gear, each turbine having an inlet and outlet, each turbine having a gear with a driving connection with said master gear, a manifold connected to the inlets of said turbines for supplying fluid under pressure to drive said turbines, the outlets of said turbines being connected to said hollow mast so as to discharge therethrough.

8. In a helicopter, a body, said body having a hollow mast, a rotor supported for rotation on said mast, gear means for driving said rotor, said gear means including a master gear, said master gear being journalled for rotation about the axis of rotation of said rotor, a plurality of turbines arranged about the periphery of said master gear, each turbine having an inlet and outlet, each turbine having a gear with a driving connection with said master gear, a manifold connected to the inlets of said turbines for supplying fluid under pressure to drive said turbines, the outlets of said turbines being connected to said hollow mast, a first heat exchanger in one of said turbine inlets, the outlets of said turbine being connected to said first heat exchanger, valve means for controlling the flow of exhaust from said turbine outlet into said hollow mast and said first heat exchanger.

9. In a helicopter, a body, a nacelle positioned on each side of said body, a faired positioning arm extending outwardly away from each side of said body, each nacelle being supported by one of said faired positioning arms, said body having a mast, a rotor supported for rotation on said mast, gear means for driving said rotor, said gear means including a master gear, said master gear being journalled for rotation about the axis of rotation of said rotor, a plurality of secondary turbines arranged about the periphery of said master gear, each turbine having a pinion gear with a driving connection with said master gear, a manifold located above said body connected to the inlets of said turbines for supplying fluid under pressure to drive said turbines, one compressor being located in each nacelle, each compressor having its outlet connected to said manifold by a discharge passage extending through its cooperating faired positioning arm, a primary turbine being located in each nacelle, each of said compressors being driven by a primary turbine, and a heat exchanger in each arm through which the discharge passage therein passes, said heat exchanger having the exhaust from a primary turbine directed therethrough, an outlet in each arm, the exhaust from each heat exchanger being directed to an outlet.

10. In a helicopter, a body, a nacelle positioned on each side of said body, a faired positioning arm extending between each nacelle and said body, a main sustaining rotor supported for rotation above said body, speed reduction gear means for driving said rotor including a master gear journalled for rotation about the axis of rotation of said rotor, a plurality of turbines arranged about the periphery of said master gear and each having a pinion having a driving connection with said master gear, a compressor being located in each nacelle, and means for supplying fluid under pressure to drive said turbines from said compressor through said arms.

11. In a helicopter, a body, a nacelle positioned on each side of said body, a faired positioning arm extending between each nacelle and said body, a rotor supported for rotation above said body, gear means for driving said rotor, said gear means including a master gear, said master gear being journalled for rotation about the axis of rotation of said rotor, a plurality of turbines arranged about the periphery of said master gear, each turbine having a driving connection with said master gear, a compressor being located in each nacelle, a manifold connected to the inlets of said turbines for supplying fluid under pressure to drive said turbines, means for supplying fluid under pressure to said manifold from said compressor through said arms.

12. In a helicopter, a body, a nacelle positioned on each side of said body, a faired positioning arm extending between each nacelle and said body, a rotor supported for rotation above said body, gear means for driving said rotor, said gear means including a master gear, said master gear being journalled for rotation about the axis of rotation of said rotor, a plurality of turbines arranged about the periphery of said master gear, each turbine having a gear with a driving connection with said master gear, a manifold connected to the inlets of said turbines for supplying fluid under pressure to drive said turbines, and means for supplying fluid under pressure to said manifold, said last named means including two compressors each driven by a separate prime mover, one compressor and its driving prime mover being located in one nacelle, the other compressor and its driving prime mover being located in the other nacelle, the outlet of one compressor being connected to said manifold between a pair of turbines through one faired positioning arm, the outlet of the other compressor being connected to said manifold between another pair of turbines through said other faired positioning arm.

13. In a helicopter, a body, a nacelle positioned on each side of said body, a faired positioning arm extending between each nacelle and said body, said body having a hollow mast, a rotor supported for rotation on said mast, gear means for driving said rotor, said gear means including a master gear, said master gear being journalled for rotation about the axis of rotation of said rotor, a plurality of turbines arranged about the periphery of said master gear, each turbine having an inlet and outlet, each turbine having a pinion gear with a driving connection with said master gear, a manifold connected to the inlets of said turbines for supplying fluid under pressure to drive said turbines, the outlets of said turbines being connected to said hollow mast so as to discharge therethrough, and means for supplying fluid under pressure to said manifold through said faired positioning arms.

14. In a helicopter, a body, said body having a hollow mast, a rotor supported for rotation on said mast, a plurality of hollow blades connected to said rotor, gear means for driving said rotor, said gear means including a master gear, said master gear being journalled for rotation about the axis of rotation of said rotor, a plurality of turbines arranged about the periphery of said master gear, each turbine having an inlet and outlet, each turbine having a gear with a driving connection with said master gear, a manifold connected to the inlets of said turbines for supplying fluid under pressure to drive said turbines, the outlets of said turbines being connected to said hollow mast so as to discharge therethrough, said hollow mast being connected to each of said hollow blades to direct gas therethrough under pressure, said last named connection including means for mixing the gas directed into each blade with air surrounding each blade.

15. In a helicopter, a body, said body having a mast, a rotor supported for rotation on said mast, a master gear being journalled for rotation on said mast, drive means connecting said master gear to said rotor, a plurality of turbines arranged below said rotor, each turbine having an inlet and outlet, each turbine having a driving connection with said master gear, and a manifold connected to the inlets of said turbines for supplying fluid under pressure to drive said turbines.

16. In a helicopter, a body, said body having a mast, a rotor supported for rotation on said mast, a master gear being journalled for rotation on said mast, gear transmission means connecting said master gear to said rotor, a plurality of turbines arranged below and around the periphery of said master gear, each turbine having an inlet and outlet, each turbine having a driving connection with said master gear, a manifold connected to the inlets of said turbines, and a duct connected to said manifold between the inlets of two turbines for supplying fluid under pressure to drive said turbines.

17. In a helicopter, a body, a nacelle positioned on each side of said body, a faired positioning arm extending outwardly away from each side of said body, each nacelle being supported by one of said faired positioning arms, said body having a mast, a rotor supported for rotation on said mast, gear means for driving said rotor, said gear means including a master gear, said master gear being journalled for rotation about the axis of rotation of said rotor, a plurality of secondary turbines arranged about the periphery of said master gear, each turbine having a pinion gear with a driving connection with said master gear, a manifold located above said body connected to the inlets of said turbines for supplying fluid under pressure to drive said turbines, one compressor being located in each nacelle, each compressor having its outlet connected to said manifold by a discharge passage extending through its cooperating faired positioning arm, a primary turbine being located in each nacelle, each of said compressors being driven by a primary turbine.

18. In a helicopter, a body, said body having a hollow mast, a rotor supported for rotation on said mast, a plurality of hollow blades connected to said rotor, gear means for driving said rotor, said gear means including a master gear, said master gear being journalled for rotation about the axis of rotation of said rotor, a plurality of turbines arranged about the periphery of said master gear, each turbine having an inlet and outlet, each turbine having a gear with a driving connection with said master gear, a manifold connected to the inlets of said turbines for supplying fluid under pressure to drive said turbines, the outlets of said turbines being connected to said hollow mast so as to discharge therethrough, said hollow mast being connected to each of said hollow blades to direct gas therethrough under pressure.

References Cited in the file of this patent

UNITED STATES PATENTS

| | | |
|---|---|---|
| 2,392,622 | Traupel | Jan. 8, 1946 |
| 2,653,778 | Bennett et al. | Sept. 29, 1953 |
| 2,687,779 | Peterson | Aug. 31, 1954 |
| 2,689,615 | Fletcher | Sept. 21, 1954 |
| 2,747,364 | Magin | May 29, 1956 |
| 2,755,038 | Gluhareff | July 17, 1956 |

FOREIGN PATENTS

| | | |
|---|---|---|
| 634,332 | Great Britain | Mar. 15, 1950 |
| 1,029,081 | France | May 29, 1953 |